Feb. 1, 1944.  A. RIDD  2,340,692
VULCANIZING DEVICE
Filed Sept. 21, 1942

Ambrose Ridd
INVENTOR.
BY C. A. Knowles

Patented Feb. 1, 1944

2,340,692

UNITED STATES PATENT OFFICE 2,340,692

VULCANIZING DEVICE

Ambrose Ridd, Louisville, Ky.

Application September 21, 1942, Serial No. 459,167

1 Claim. (Cl. 18—18)

This invention relates to vulcanizers, designed primarily for vulcanizing and repairing pneumatic tire shoes or casings.

An important object of the invention is to provide a vulcanizing device of the portable type, which may be readily and easily operated to effectively accomplish the vulcanizing result when used in vulcanizing tire shoes or casings of various sizes.

Another object of the invention is to provide a portable vulcanizing device embodying a removable core of a construction to conform to the shape of the interior of the tire shoe, together with means for forcing the tire shoe into engagement with the core, means being also provided for supplying the necessary heat to vulcanize the shoe, while the shoe is under pressure.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
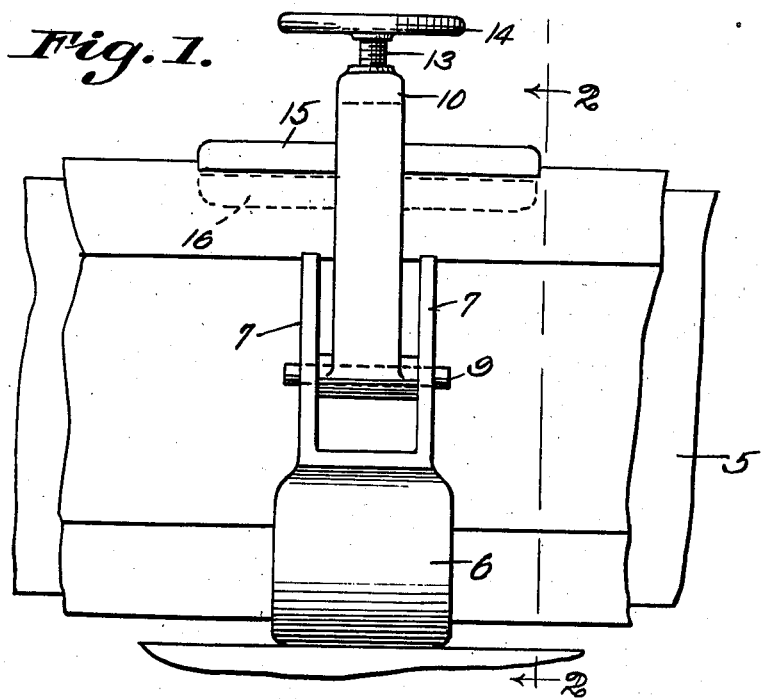
Figure 1 is an elevational view illustrating a vulcanizer constructed in accordance with the invention, as positioned around a tire shoe to be vulcanized.

Referring to the drawing in detail, the vulcanizer embodies a core indicated by the reference character 5. The core 5 is of solid construction, and is shaped to conform to the interior of a predetermined tire shoe. In the use of the device, it will of course be understood that the cores which are used as a part of the vulcanizer, will be shaped to fit within various sized tire shoes.

The vulcanizer also includes a body portion comprising a substantially U-shaped lower clamping member 6, which is substantially wide, as shown by Figure 1 of the drawing, so that when pressure is applied to the body portion, during the vulcanizing operation, the body portion will not injure the casing, due to excessive pressure being applied to the body portion.

At one end of the lower clamping member, are spaced members 7, which are formed integral with the lower clamping member, the side faces of the members 7 being disposed at right angles with respect to the upper and lower surfaces of the lower clamping member. A plurality of openings 8 are arranged in these members 7, and are designed to receive the pin 9 that adjustably connects the upper clamping member 10 to the lower clamping member 6.

Figure 2:
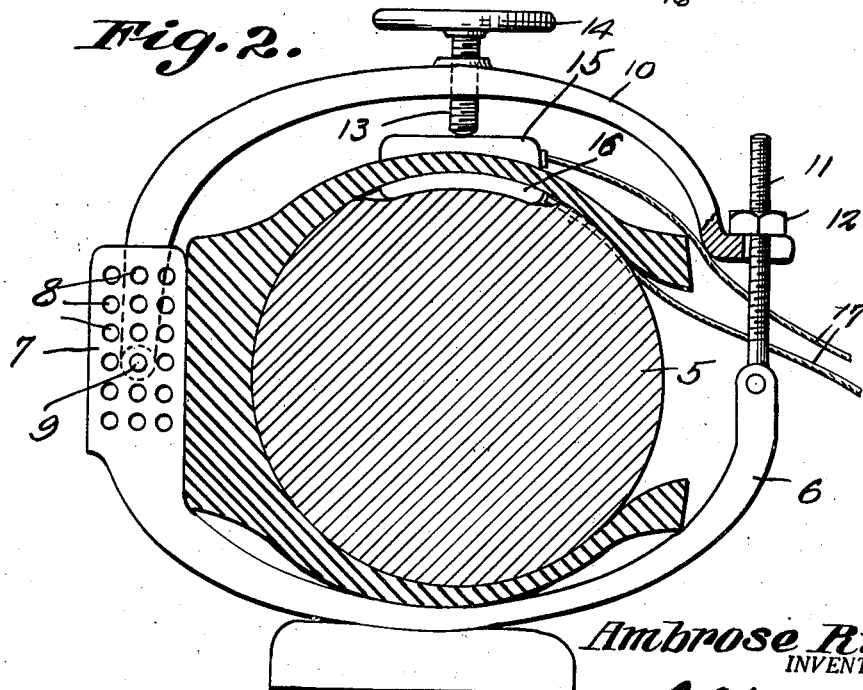
Figure 2 is a sectional view taken on line 2—2 of Figure 1.

The upper clamping member 10 is curved so that it will fit around a tire casing, as shown by Figure 2, the end of the upper clamping member which is fitted between the spaced members 7 being of a width to extend throughout the entire space between the members 7, to hold the upper clamping member against rocking, when pressure is brought to bear thereon in clamping the casing or shoe to be vulcanized.

By adjusting the pin 9 to various openings of the members 7, it will be obvious that the body portion may be readily adjusted to fit around tire casings or shoes of various sizes. It might be further stated that in positioning the body portion over a tire shoe, the inner straight edges of the spaced members 7, fit against the tread portion of the tire casing or shoe to hold the tire casing or shoe against slipping, when the body portion is being clamped in position. It will also be seen that the inner straight edges of the members 7 form a stop to prevent bulging of the tire at the tread, under the pressure of the device.

The free end of the upper clamping member 10 extends at right angles, where it is provided with a notch to accommodate the bolt 11, which is pivotally connected with the free end of the lower clamping member 6, as shown by Figure 2. A nut indicated at 12 is positioned on the bolt, so that when the nut is swung into the notch of the upper clamping member, the nut may be rotated to draw the free ends of the upper clamping member and lower clamping member of the body portion, together, accomplishing the initial adjustment of the body portion on the tire casing.

In addition to the bolt 11 and nut 12, the body portion is provided with a pressure screw 13 which operates through a threaded opening formed in the upper clamping member 10, the pressure screw being provided with a hand wheel 14, whereby the pressure screw may be conveniently operated.

The heating elements of the vulcanizer, are preferably of the electric type, and include an upper member 15 and a lower member 16, the upper and lower members 15 and 16 having their tire engaging surfaces curved, to conform to the curvature of the tire casing with which they are used. These heating elements 15 and 16 embody electric resistance wires housed in casings, and electric wires 17 leading to the heating elements to supply electric current, from a suitable source of electricity supply.

The core 5 is also provided with a cut away portion to accommodate the lower heating element, to insure against slippage of the heating element with respect to the core, when pressure is being applied to the heating elements to clamp the tire shoe or casing, prior to the vulcanizing of the casing.

When it is desired to vulcanize a tire casing, it is only necessary to select a core 5 of the proper diameter to fill the shoe or casing under treatment. The core is now positioned so that the cutout portion thereof in which the heating element is placed, lies opposite to the rupture or portion of the casing to be vulcanized. The lower heating element 16 is now positioned against the portion of the casing to be vulcanized, and the other heating element is positioned against the outer surface of the shoe or casing, directly opposite to the inner or lower heating element. The body portion including the members 6 and 10, are now positioned as shown by Figure 2 of the drawing, and the nut 12 is operated to secure the body portion in position. The screw 13 is now operated to set up a clamping action between the heating elements 15 and 16, and the shoe or casing under treatment. After the positioning of the device, electric current is applied to the heating elements to accomplish the vulcanizing of the shoe or casing.

Having thus described the invention, what is claimed is:

A portable vulcanizing device comprising in combination, a solid core shaped to fit the interior of a tire casing, said core having a recess formed in the outer surface thereof adapted to receive a vulcanizing element of a thickness equal to the depth of the recess, said recess providing a support for said vulcanizing element and adapted to hold the vulcanizing element against the interior of a tire under repair, a body portion adapted to be clamped around the tire in which the core is positioned, and means mounted on the body portion for clamping a vulcanizing element into engagement with the tire directly over the first mentioned vulcanizing element.

AMBROSE RIDD.